United States Patent [19]

Bartko

[11] 3,832,545

[45] Aug. 27, 1974

[54] NUCLEAR TECHNIQUES FOR DETECTING THE PRESENCE OF EXPLOSIVES

[75] Inventor: John Bartko, Pittsburgh, Pa.

[73] Assignee: Westinghouse Electric Corporation, Pittsburgh, Pa.

[22] Filed: Sept. 28, 1972

[21] Appl. No.: 290,901

[52] U.S. Cl.............. 250/312, 250/359, 250/367, 250/369, 250/492
[51] Int. Cl..................... G01t 1/203, G01j 39/18
[58] Field of Search ...... 250/83.3 R, 71.5 R, 106 T, 250/312, 359, 367, 492

[56] References Cited
UNITED STATES PATENTS

| 3,146,349 | 8/1964 | Jordan | 250/83.3 R |
|---|---|---|---|
| 3,308,296 | 3/1967 | Cowen et al. | 250/71.5 R |
| 3,594,577 | 7/1971 | Loveday | 250/83.3 R |

Primary Examiner—James W. Lawrence
Assistant Examiner—Harold A. Dixon
Attorney, Agent, or Firm—M. P. Lynch

[57] ABSTRACT

The invention pertains to a nuclear technique for monitoring objects such as luggage and parcels to determine the presence of specified nitrogen containing materials such as explosives as a function of the nitrogen content and concentration profile. Objects to be analyzed to determine the presence of nitrogen are subjected to a thermal neutron environment and the gamma ray radiation produced by the object in response to nitrogen reactions is monitored by gamma ray detectors. The gamma ray detectors produce indications of the nitrogen content of the object and the concentration profile of the nitrogen in the object. The information provided by the gamma ray detectors is processed to determine if the measured nitrogen content and concentration corresponds to a class of nitrogen containing material of interest, i.e. explosives.

21 Claims, 7 Drawing Figures

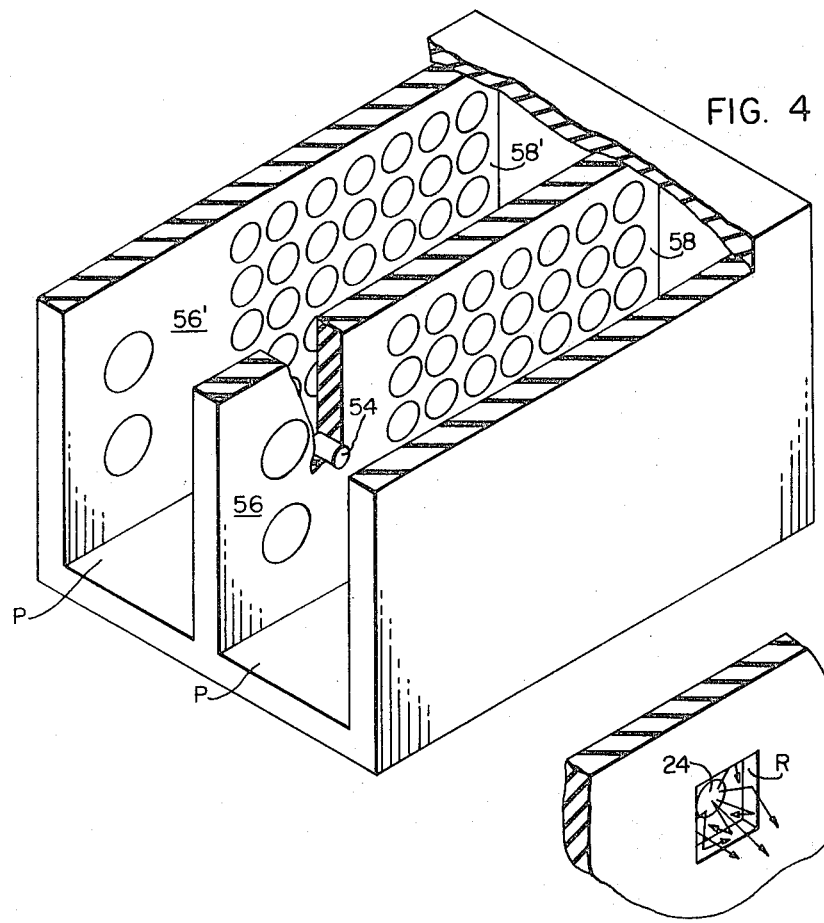
FIG. 4
FIG. 3
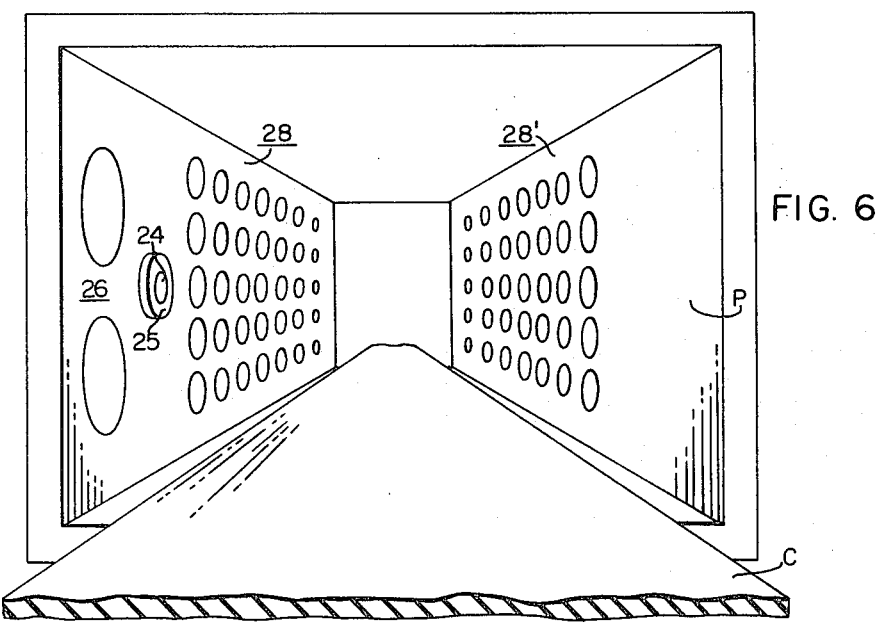
FIG. 6

NUCLEAR TECHNIQUES FOR DETECTING THE PRESENCE OF EXPLOSIVES

BACKGROUND OF THE INVENTION

The significant threat to human life and property resulting from explosive devices concealed in luggage, parcels, buildings, air craft, etc. has resulted in a demand by both the public and private sector of the country for a reliable technique for the detection of such explosive devices.

A technique which attempts to detect explosives solely on the basis of total nitrogen content is inadequate in view of the nitrogen content found in articles made of wool, silk, nylon, orlon and leather. For a system to be acceptable it must necessarily exhibit a capability to identify preselected classes of nitrogen containing material, a low false alarm characteristic and a relatively fast response characteristic. The latter characteristic is especially important in an application for monitoring luggage and parcels at airports where undue delay in processing can result in unacceptable passenger inconvenience as well as an interruption of transportation schedules.

SUMMARY OF THE INVENTION

Nitrogen is a common element found in explosives varying in abundance from 8 to 50 percent with an average of about 15 percent.

There is described herein an embodiment of a nuclear technique for detecting the presence of a specific nitrogen containing material, herein selected to be explosives, based on nitrogen reactions produced by objects subjected to a thermal neutron flux environment. The embodiment includes an object inspection station wherein a neutron moderator material, such as parafin, forms an object passageway having a suitable opening to accept the designated object, i.e. luggage. A thermal neutron flux environment is produced within the passageway in response to the thermalization of fast neutrons introduced into the passageway from a fast neutron source. The presence of nitrogen-containing material within the object results in the capture of thermal neutrons by the material and a subsequent reaction resulting in the emission of prompt gamma rays in response to the nitrogen characteristic of the material.

In the typical embodiment illustrated a first set of gamma ray detectors, approximately 5–7 inch in diameter, responds to the gamma ray radiation emitted by the object by producing output signals which are processed to indicate the nitrogen content of the object. A second set of gamma ray detectors, approximately 1–3 inches in diameter, and arranged in an array, respond to the gamma ray radiation emitted by the object to effectively map the object and provide a plurality of signals which are processed to determine the concentration profile of nitrogen in the object.

Yet another embodiment illustrates a second array of 1–3 inches diameter detectors identical to the first set is oppositely positioned to assure linear alignment between the respective detectors of the first and second array. The double array assures a more reliable analysis of an object positioned between the arrays.

While numerous gamma ray detectors are available including sodium iodide scintillators and Cerenkov counters, the liquid and plastic scintillators appear to provide a response more suitable for accurate and fast identification of the nitrogen containing material present in an object.

Neutron sources available for use include deuterium-tritium accelerators or mixtures of beryllium and an alpha emitting radioactive element.

Alternatively a californium-252 source may be used. Californium neutron sources are small and therefore have a high degree of utility and adaptability in the design of specific equipment. Moreover, californium-252 produces neutrons due to spontaneous fission and the neutrons produced are relatively low in energy. Since the invention relates to the measurement of activation produced by thermal neutrons, the relatively low energy of californium-252 neutrons makes such a source advantageous in certain embodiments of the invention.

Of particular interest is the nitrogen reaction $^{14}N(n,\nu)^{15}N$. In the nitrogen reaction $^{14}N(n,\nu)^{15}N$, a low energy or thermal neutron is captured by a $^{14}N$ nucleus resulting in an excited $^{15}N$ nucleus which promptly deexcites to its stable state by the emission of gamma radiation. The notable feature of this reaction that enhances its application for use in an explosive detection scheme is the fact that in 14 percent of all nitrogen reactions a high energy, 10.8 MeV, gamma ray is produced. Gamma rays of this energy level are rare in other elemental neutron reactions. In contrast the fast neutron nitrogen reaction $^{14}N(n,2n)^{13}N$ produces a gamma ray level of approximately 0.511 MeV. The latter gamma ray level is not only more difficult to accurately detect due to its relatively low value but the value also corresponds to the gamma ray radiation produced by other nitrogeneous materials thus making it more difficult to discriminate between explosive and non-explosive nitrogeneous materials such as wool, orlon, nylon, silk, leather, etc.

In a specific embodiment of the invention described herein there is illustrated an explosive detection system for monitoring luggage (on the basis of the nitrogen reaction $^{14}N(n,\nu)^{15}N$) wherein the luggage is placed on a conveyor which transports the luggage through an enclosed passage defined by a neutron moderator within which is positioned the fast neutron source (isotopic or machine) and the first and second set of gamma ray detectors. Signal processing circuitry connected to the first and second set of gamma ray detectors responds by producing an indication if a piece of luggage contains nitrogen in content and concentration profile representative of a specific class of nitrogen contained material, i.e. explosives.

DESCRIPTION OF THE DRAWINGS

The invention will become more readily apparent from the following exemplary description in connection with the accompanying drawings:

FIG. 3 is a schematic illustration of a variation of the positioning of the neutron source in the housing of the embodiment of FIG. 1;

FIG. 4 is a schematic illustration of an alternate embodiment of the invention;

FIG. 6 is an illustration of a variation of the embodiment of FIG. 1; and

DESCRIPTION OF THE PREFERRED EMBODIMENT

Figure 1:
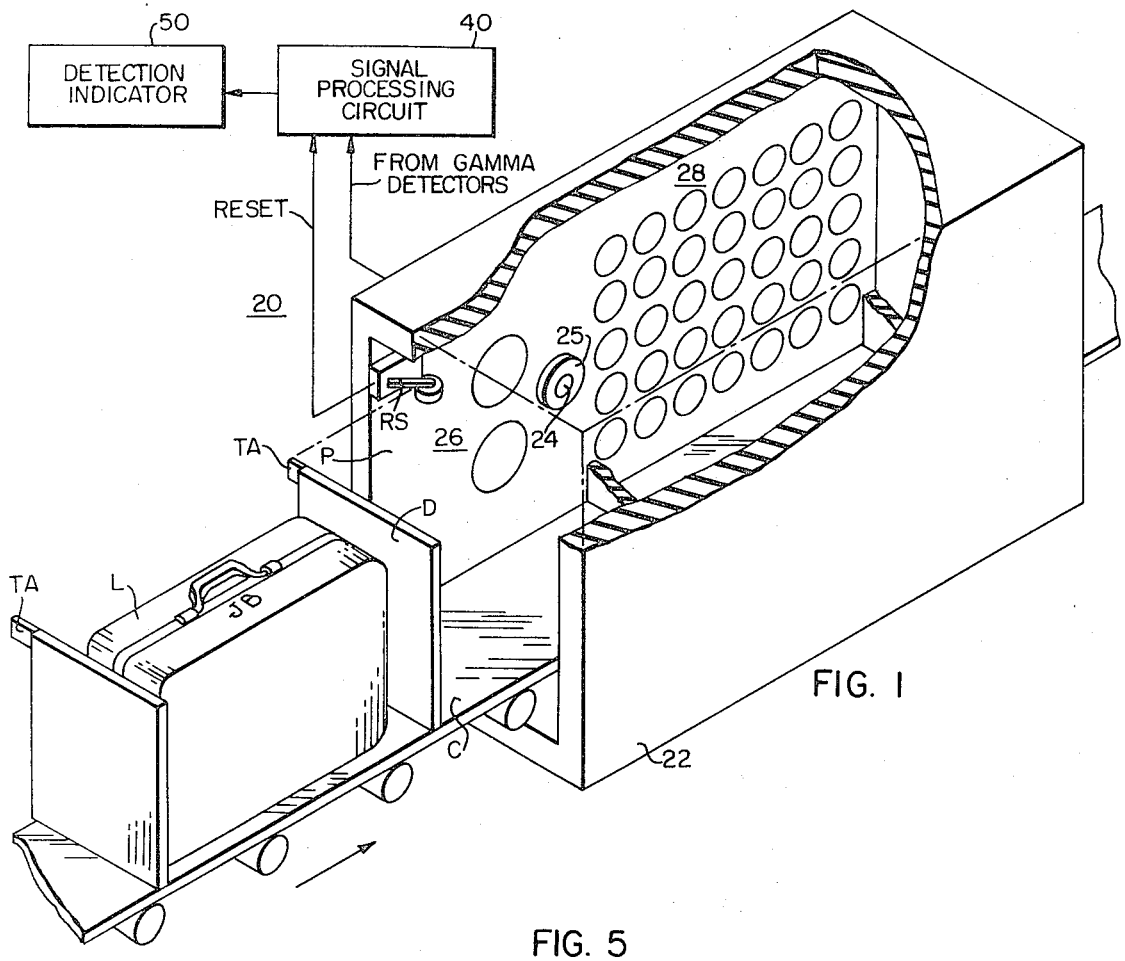
FIG. 1 is a block diagram schematic illustration of an embodiment of the invention.

Referring to FIG. 1, there is illustrated schematically an explosive detection system 10 comprised of an object monitoring station 20, signal processing circuit 40 and detection indicator circuit 50. The object monitoring station 20 is illustrated as including a housing 22 composed of a nuclear moderator material having a passage P therethrough for inserting and removing the object to be analyzed for the presence of explosives. A fast neutron source 24, such as californium 252, positioned in the wall of the housing 22 emits fast neutrons into the walls of the passage P which are subsequently converted to slow or thermal neutrons following contact with the nuclear moderator material 22. The moderating action of the nuclear moderator material 22 functions to establish an essentially thermal neutron gas or flux within the passage P at a vicinity adjacent to the neutron source 24. The introduction of an object herein identified to be luggage L by means of a conveyor system C extending through the passage P into the thermal neutron flux results in the radiation of the lugage L. Gamma rays produced by the luggage L in response to neutron induced reactions resulting from the radiation of the luggage L are monitored typically by a first and second set of gamma ray detectors 26 and 28 respectively. The implementation and utilization of $^{14}N$ neutron induced reactions for the purpose of detecting the presence of explosives has proven feasible due to the relatively high penetrating power of neutrons and relatively high content of nitrogen in all explosives. Furthermore, of the two $^{14}N$ neutron induced reactions, $^{14}N(n,\nu)^{15}N$ and $^{14}N(n,2n)^{13}N$, the former reaction is a thermal neutron reaction and exhibits distinct advantages in that 14 percent of all gamma rays emitted by nitrogen-containing material are gamma rays having energies of approximately 10.8 MeV which is significantly higher than most other neutron induced nitrogen reactions.

In connection with the conveyor C there is illustrated, spaced-apart vertically disposed divider members D which function to divide conveyor C into sections for accommodating objects to be transported through the monitoring station 20. Preferably the divider members D are composed of neutron moderator material similar to that comprising housing 22 and as such cooperate with the walls of the passage P within the housing 22 to effectively establish an enclosed thermal neutron environment by effectively closing off the end openings of the passage P. The divider members D, when constructed from a neutron moderator material, thus function as a shielding element to minimize loss of thermal neutrons to the environment outside the housing 22 and in so doing effectively increase the thermal neutrons remaining within the passage P to provide an optimum thermal neutron flux for monitoring the nitrogen content of the object L.

While there are several techniques for developing the desired thermal neutron flux, the embodiment of FIG. 1 illustrates one of the more simpler techniques of utilizing a fast neutron source 24 in conjunction with a suitable moderator material wherein collision of the fast neutrons with the moderator results in thermalization of the fast neutrons. This technique is described in U.S. Pat. No. 3,124,679 issued Mar. 10, 1964 and entitled Nuclear Determination of Nitrogen Content.

A review of collision kinetics discloses that the closer the mass number of the element to that of a neutron (approximately 1) the greater the energy transfer will be per collision. Therefore, in order to obtain optimum thermalization of the fast neutrons it is advantageous to select a hydrogen rich material such as water or paraffin for use as the moderator material 22 in the embodiment of FIG. 1. The complete enclosure of the passageway P by the moderator material provides optimum collision surface for the fast neutrons emitted by the neutron source 24. The ultimate sensitivity of the system depends on the level of thermal flux at the detection location within the passageway P. As noted above the divider members D serve to increase the level of thermal flux. In addition to the hydrogen rich materials other low atomic numbered elements such as carbon, deuterium, etc. may be useful as moderator material. The sensitivity of the system can be further increased through the use of primarily organic materials in the fabrication of monitoring station 20 and conveyor C since gamma rays resulting from neutron induced reactions in organic materials are very low in energy and as such will be easily distinguishable from the 10.8 MeV gamma rays of interest.

Experimental analysis has shown that the thermal flux within a passage is approximately proportional to the inverse area of the passage. Therefore, it is advantageous to maintain the area of the passage at the minimum area suitable for accommodating the objects to be analyzed. Furthermore, it has been determined that the ratio of the thermal flux to the fast neutron flux at any location near a wall of the passage is a constant for a cavity geometry. Thus by measuring flux values at different locations in a cavity of a particular size and geometry the corresponding values for similarly shaped cavities of other sizes can be determined.

The selection and positioning of the neutron source 24 within the moderator 22 also has a significant effect on achieving the desired high thermal flux/fast flux ratio. Investigation of change in thermal flux due to positioning of the neutron source 24 indicates that a significant increase in thermal flux is obtained by positioning the neutron source in a recess R in the wall of the moderator as typically illustrated in FIG. 3. The recess R provides additional wall surface for reflecting thermalized neutrons into the passage P. An additional increase in the thermal flux can be realized by essentially encapsulating the neutron source 24 in a moderator material 25. The moderator material 25 encapsulating the neutron source 24 functions as a preliminary neutron thermalization stage. It enhances the thermal neutron flux in the passage P by slowing down many neutrons prior to their contacting the walls of the passage P. Thus the neutrons are at a reduced energy level when they strike the walls and can be more readily reflected back into the passage P. Essentially the encapsulation of the neutron source 24 with the moderator material 25 reduces the number of fast neutrons which are thermalized deep in the walls of the moderator 22 where there is a greater probability of capture and thus less chance of them being reflected into the passage P.

The first set of gamma detectors 26 of FIG. 1 is comprised of several large volume gamma detectors LVD herein selected to be of the plastic or liquid scintillator type. The diameter of the large volume gamma detectors LVD is typically in a range of 5–7 inches with a depth of at least 5 inches. The large volume gamma detectors LVD of the first set 26 function to produce a counting rate indicative of gross nitrogen content of the irradiated object L. The number of large volume detectors employed in the first set 26 is basically a function of the neutron source strength, the nitrogen content to be detected and the rate at which objects are transported through the monitoring station 20. A single large volume detector LVD could prove adequate if the object L was stationary.

Figure 5:
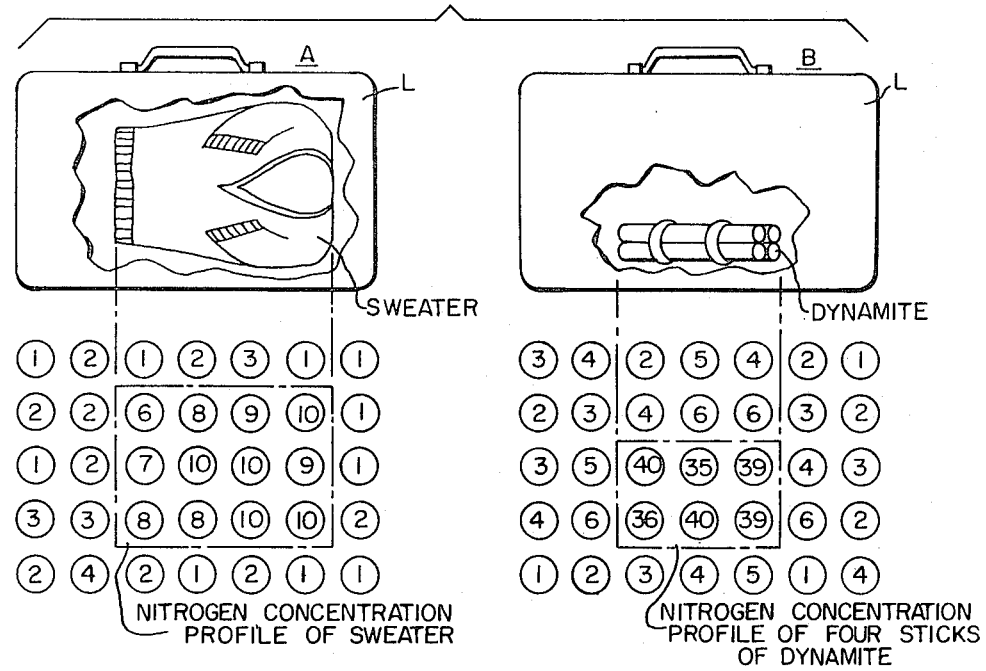
FIG. 5 is a comparison of the output of the neutron detector array of FIG. 1 for an explosive and a wool sweater.

The second set of gamma detectors 28 is comprised of an X–Y array of typically 20 to 30 narrow gamma detectors ND of diameters typically between 1–3 inches spaced at 4 inch centers as shown in FIG. 5. In contrast to the large volume detectors LVD of the first set 26 which respond to the gross 10.8 MeV gamma rays emitted by the object L, the narrow detectors ND of the second set 28 respond to the gamma rays emitted from a predetermined portion of the object L and thus produce a count output indicative of the nitrogen content within a predetermined portion of the object L.

The operation of the narrow detectors ND over a limited area is explained by the fact that high energy gamma rays interact with liquid or plastic scintillators mainly via compton interaction which results in the production of recoil electrons. The 10.8 MeV gamma rays resulting from the nitrogen reaction $^{14}N(n,\nu)^{15}N$ produce electrons with energies in the range of 0–10.6 MeV. The electrons which recoil with the highest energy are the electrons which are propelled forward by the incident gamma radiation. The range of a 10 MeV electron in a plastic or liquid scintillator is about 5 gm/cm$^2$ in plastic. This means that many of the high energy electrons produced by gamma rays entering the side of a narrow detector will escape from the narrow detector before they have lost all their energy. In contrast, those gamma rays entering the front or face of the narrow detector will produce many full energy electrons traveling down the long axis of the narrow detector resulting in an increased probability of a full energy output pulse from the narrow detector ND. In addition, the probability of gamma ray interaction increases with the length of the narrow detector, thus favoring gamma rays entering from the front surface of the gamma detector. Thus, it would be expected that the counting rate above 10 MeV in a long narrow gamma detector would reflect the nitrogen density in that portion of the object L immediately in front of the narrow detector ND. The length of the narrow detectors is in a range of approximately 8–12 inches.

The capability of determining the gross nitrogen content of an object L by the first set of gamma detectors 26 and the concentration profile or density of the nitrogen at various portions of the object L by the second set of gamma detectors 28 provides information suitable for processing by signal processing circuit 40 so as to identify not only nitrogen containing objects but also the capability of identifying a specific type of nitrogen containing object, i.e. an explosive; on the basis of its nitrogen concentration profile. This discriminating capability is apparent when it is considered that while two completely different types of nitrogen containing objects such as a heavy wool sweater and a package of sticks of dynamite may exhibit similar gross nitrogen contents, the concentration profile of the nitrogen in the package of dynamite will differ significantly from the concentration profile of nitrogen in the wool sweater. Thus, reliable detection of explosives in the presence of other nitrogen containing material can be reliably achieved by adjusting the signal processing circuit 40 to produce an output indication solely in response to gross nitrogen content information and nitrogen concentration information indicative of the preselected type of nitrogen containing object, i.e., an explosive.

The arrangement of large volume detector (LVD) of the first set 26 and narrow detectors (ND) of the second set 28 in combination with the neutron source 24 represents a preferred embodiment for use in monitoring objects moving at a relatively fast rate through the passage P. Numerous other variations of this combination can be implemented to provide the desired indication of gross nitrogen content and nitrogen concentration of monitored objects. In an embodiment where the object L is stationary, it might not be necessary to include the large volume detector LVD of the first set 26 inasmuch as sufficient counts might be produced by the stationary object to enable the array of narrow detectors ND of the second set 28 to provide both a gross nitrogen content indication through the summation of the counts of the individual narrow detectors ND as well as the nitrogen concentration profile indication as described above.

Furthermore, in the embodiment illustrated in FIG. 1 for monitoring objects passing at a predetermined rate the first set of detectors 26 could be eliminated and its function satisfied by increasing the size of the neutron source 24 to sufficiently increase the thermal neutron flux present within the passage P which would enable the narrow detectors ND of the second set 28 to produce a sufficient count which cumulatively would provide a gross nitrogen indication and independently would provide the nitrogen concentration information.

In another variation of the embodiment of FIG. 1, which would permit the elimination of the first stage 26 while not increasing the size of neutron source 24, the number of individual narrow detectors ND of the second set could be increased sufficiently to assure a cumulative count from the narrow detectors ND to provide the gross nitrogen content information originally provided by the first set 26.

It is apparent therefore that numerous configurations and arrangements of detectors can be implemented to achieve the desired gross nitrogen and nitrogen concentration information necessary to identify not only a nitrogen containing object but to classify the nitrogen containing object. It is also apparent that the basic implementation of this system requires a neutron source and an array of independent narrow detectors in a combination to provide gross nitrogen and nitrogen concentration information.

Furthermore the positioning of the gamma detectors relative to the neutron source is a matter of design. In FIG. 1 the detectors are shown to be positioned on either side of the neutron source in order to locate them as close as possible to the peak thermal neutron flux within the passage P.

Referring to FIG. 4 there is illustrated an alternate embodiment of the monitoring station of FIG. 1 wherein two passages are provided adjacent one another and served by a single neutron source 54. Separate sets of LVD and ND gamma detectors 56 and 58, and 56' and 58' are positioned in the respective passages to monitor independently objects such as luggage passed through the individual passages. The configuration of FIG. 4 when considered for use in monitoring luggage at an airport, provides for more rapid processing of luggage thereby reducing passenger inconvenience.

Figure 2:
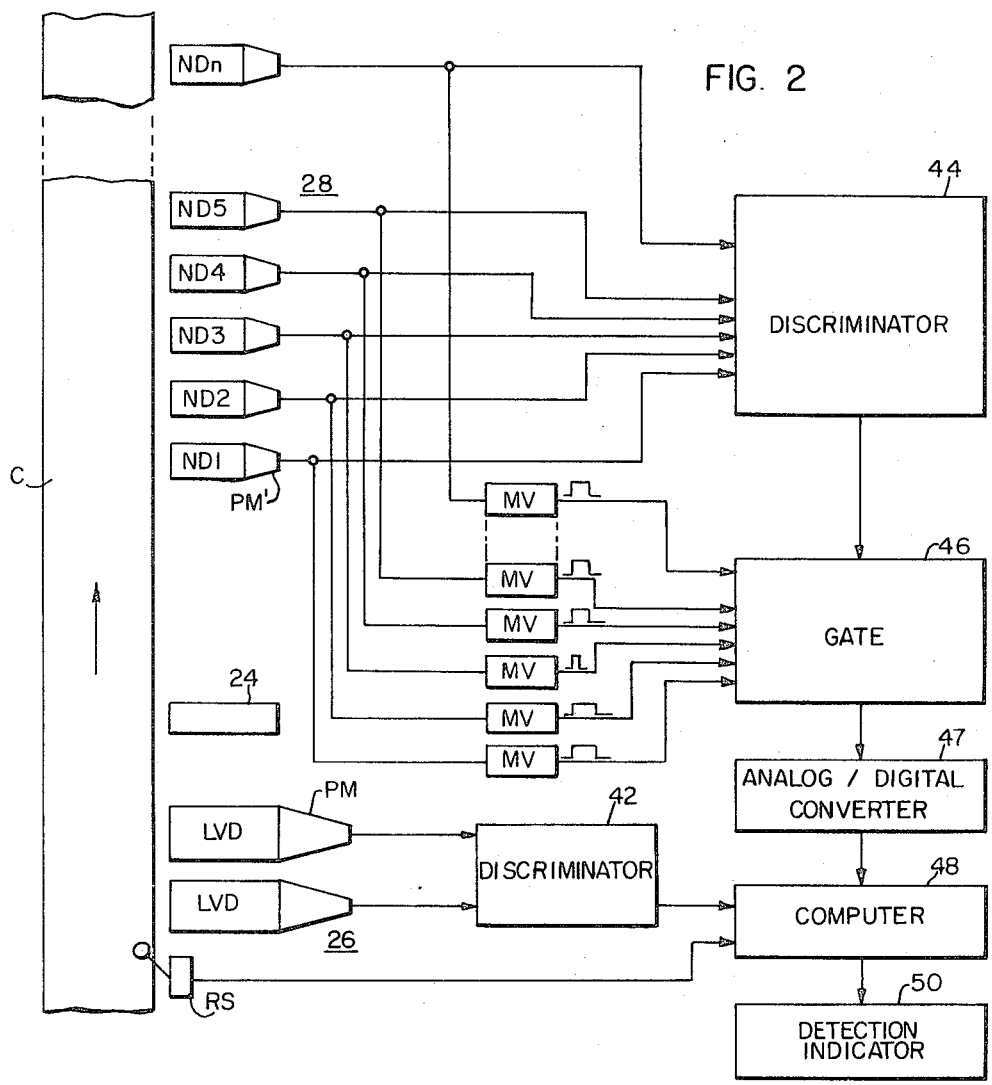
FIG. 2 is a schematic illustration of the signal processing circuit of the embodiment of FIG. 1.

Referring to FIG. 2 there is schematically illustrated an implementation of the signal processing circuit 40 for the configuration of the first and second sets of neutron detectors illustrated in FIG. 1. Operatively associated with each large volume detector LVD of the first set 26 is a photomultiplier tube PM. Likewise, associated with each of the narrow detectors ND of the second set 28 is a photomultiplier tube PM'.

The photomultiplier tubes are optically coupled to the respective gamma detectors such that the light energy developed within each detector resulting from gamma ray impingement on the photosensitive cathode of the photo-multiplier tube produces electrons via the photoelectric effect which are then amplified into an electrical pulse. The amplitude of the pulse corresponds to the available light energy.

The outputs of the photomultipliers PM associated with the large volume gamma detectors LVD of the first set 26 are supplied as input signals to the discriminator circuit 42. Discriminator circuit 42 compares the level of the signals to a threshold level and produces output signals corresponding to input signals which exceed the threshold level. In the application for determining the gross nitrogen content of the object L on the basis of the nitrogen reaction $^{14}N(n\nu)^{15}N$ which produces 10.8 MeV gamma radiation, the threshold level would be approximately 10.0 MeV. The output signals from the discriminator circuit 42 are supplied to the computer 48 as an indication of the gross nitrogen content of the object L. For the nitrogen reaction selected a threshold level of approximately 10 MeV is selected in order to essentially isolate the 10.8 MeV signals of interest.

The individual outputs of the photomultiplier tubes PM' associated with the individual narrow detectors ND of the second set 28 are each processed identically, thus a discussion relating to one of the narrow detectors ND1 will apply equally to each of the remaining narrow detectors ND2 through ND$n$.

The output of the photomultiplier tube PM' associated with the narrow detector ND1 is applied simultaneously to the discriminator circuit 44 similar to discriminator circuit 42, and a triggerable monostable multivibrator circuit MV. Each of the multivibrator circuits MV associated with the respective narrow detectors ND is set to produce an output pulse in response to an input signal from the associated photomultiplier PM'. The width of the output pulse of each of the respective multivibrators MV is different such that the pulse width outputs of the respective multivibrator circuits can be identified as being the result of an output of a certain one of the narrow detectors ND. The outputs of the respective multivibrator circuits MV are applied as signal inputs to a linear gate circuit 46. The discriminator circuit 44 functions to compare the output signals from the respective photomultiplier tubes PM' to a threshold level indicative of the signal level of interest. The threshold level in the embodiment based on a nitrogen reaction $^{14}N(n,\nu)^{15}N$, which produces a substantial number of gamma rays exhibiting 10.8 MeV is approximately 10.0 MeV.

The output signals produced by the discriminator circuit 44 in response to input signal exceeding the threshold level are supplied as gate input signals to the gate circuit 46. The presence coincidentally of a signal input from a multivibrator circuit MV at the gate circuit 46 with a gate input signal from the discriminator circuit 44 resulting from an output signal from the same narrow detector ND will result in the gating of the output signal from the multivibrator circuit MV through the analog to digital converter 147 to the computer 48. The gated signals from the respective narrow detectors reflects the concentration of nitrogen in that portion of the object L viewed by its associated narrow detectors ND.

The computer circuit 48 functions to examine the profile of nitrogen concentration reflected by the total array of narrow detectors ND to determine if the profile or image of the nitrogen containing object corresponds to the profile or image of the nitrogen containing object of interest. In the case of explosives wherein, for example, the reference for explosives is considered to be four sticks of dynamite, the computer will determine if the profile of the object as determined by the measurement of nitrogen concentration provided by the narrow detectors ND corresponds to the profile of four sticks of dynamite. If it is determined by the computer for example, that the nitrogen concentration profile of the object as represented by the information provided by narrow detectors ND exhibiting an unusually high nitrogen content corresponds to the profile of four sticks of dynamite, and if the input to the computer from the large volume detectors LVD provides a gross nitrogen content representative of four sticks of dynamite, the computer circuit 48 will produce an output signal to actuate detection indicator circuit 50. The detection indicator circuit 50 can take the form of a visual or audio indicator, a cathode ray tube monitor, a recording mechanism, etc.

The computer 48 enters the nitrogen count of each narrow detector ND gated by the gate circuit 46 at a predetermined location in its memory bank; the location being defined by the particular pulse width associated with each narrow detector ND. During the time interval when the object L is present or passing before the array of narrow detectors, the computer 48 continuously scans the count information stored in the memory bank. After the object is removed from or has passed the array of narrow detectors ND, the computer 48, through the use of a routine program, examines the counts stored at the various locations in the memory bank to determine the location of count values corresponding to the nitrogen-containing material of interest and defines the effective area of the nitrogen-containing material of interest. In the typical embodiment referred to above where explosives are the material of interest, the computer responds to the count locations exhibiting an unusually high nitrogen concentration which is typical of explosives, and develops the effective area for nitrogen concentration profile represented by the output of the narrow detectors exhibiting the unusually high count. As for example, assuming the nitrogen count corresponding to a wool sweater is ten while a nitrogen count of a narrow detector ND in response to an explosive is 40. The computer, if programmed to respond to the presence of explosives, would determine the number of memory bank locations indicating a count of approximately 40, determine the effective X-Y area represented by these memory bank locations and produce an output manifestation if the effective area corresponds to the effective area of an explosive package of interest. Continuing with the example of a package of four sticks of dynamite which represents a length of approximately 8 inches and a square cross-section of approximately two inches per side, the computer 48 would be programmed to provide an output manifestation of an effective area of memory bank locations exhibiting counts of approximately 40 of two-by-eight inches or less. It is well within the computer's capability to determine this effective area whether the memory locations exhibiting counts of approximately 40 are adjacent to one another or are at various locations throughout the X-Y array. If the four sticks of dynamite were packaged in a single package then the memory locations exhibiting a count of approximately 40 would form a continuous area of high concentration whereas if the four sticks of dynamite were separated and positioned at different locations within the object L the memory locations exhibiting the count of 40 would be in different locations of the memory bank.

If the object L is moving by the X-Y array of narrow detectors instead of being stationary before the array, this results in an increasing count in the narrow detectors ND positioned in columns which are viewing the object and a fixed count in the narrow detectors position in columns no longer viewing the object. The computer 48, while continuously scanning the counts stored in the memory bank determines the horizontal or X dimension of the nitrogen-containing material to be represented by the number of columns of narrow detectors at any given instant of time which are exhibiting an increasing or active counting condition.

After determining the effective area of the nitrogen containing material in the object L, the computer 48 determines if the nitrogen concentration profile and the total nitrogen content, as determined by the first set of detectors 26, of the nitrogen-containing material in the object L corresponds to that of a nitrogen-containing material of interest, i.e., an explosive. If both characteristics i.e. the nitrogen concentration profile and the total nitrogen content, correspond to the characteristics of the nitrogen containing material of interest the computer 48 will then supply an activating signal to the detection indicator circuit 50.

A reset signal, typically illustrated as being provided by the passage of divider member D upon which is positioned a trigger arm A for actuating reset switch RS located within passage P, is supplied to computer 48 to reset the computer following evaluation of each object L thus establishing the computer in a clear condition in order to respond to the next object on the conveyor C.

A comparative illustration of the response of the array of narrow detectors ND of the second set 28 to a package of four sticks of dynamite and a large wool sweater is depicted in illustrations A and B of FIG. 5.

Figure 7:
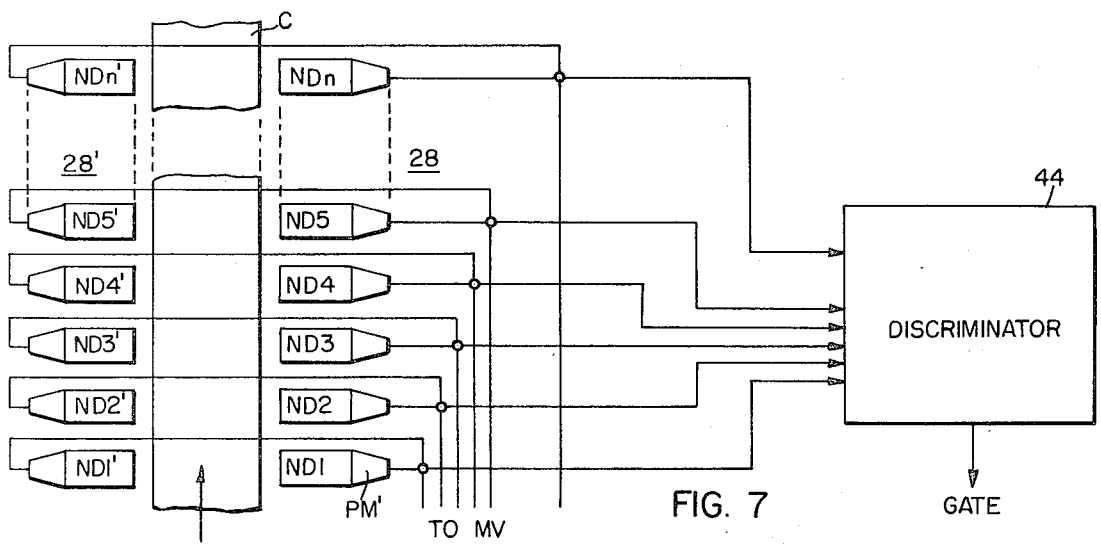
FIG. 7 is an electrical schematic illustration of the variation of FIG. 6.

It has been determined experimentally that the reliability of the development of the nitrogen concentration profile can be increased by the addition of a second array of narrow detectors ND positioned in the wall of the passageway directly opposite to the array of the second set 28. As illustrated in FIG. 6 the additional two dimensional array of narrow detectors 28' comprised of narrow detectors ND1' – NDn' is identical to the two dimensional array of the second set 28. The respective detectors of the duplicate sets i.e., ND1 and ND1', are aligned in a directly opposite relationship so as to view the identical portion of the object L. The addition of a second array of narrow detectors provides an essentially uniform response across the area of passage P to gamma radiation and as such improve the detection reliability of the system. The outputs from the oppositely aligned pairs of narrow detectors are combined and supplied as a single composite signal, as illustrated in FIG. 7, to the corresponding multivibrator circuit MV and as a single input of the fast discriminator circuit 44.

The configurations of the arrays of narrow detectors ND can be varied to satisfy specific operational requirements.

Numerous techniques utilizing existing hardware are available to implement the functional operation of the signal processing circuit 40 typically described above. The following list of commercially available equipment satisfies one obvious implementation of the embodiment schematically illustrated in FIG. 2:

| Apparatus of FIG. 2 | Corresponding Commercially Available Apparatus |
| --- | --- |
| Discriminator Circuits 42 and 44 | T101 Discriminator and T200/N Fast Count Discriminator Modules available from the Nuclear Instrumentation Div. of EG&G. Also Model ND12 Discriminator supplied by Crystal Electronics Dept. of the Harshaw Chem. Co. |
| Gate Circuit 46 | Model NG-11 Linear Gate provided by the Crystal Electronic Products Dept. of the Harshaw Chem. Co. |
| Multivibrator circuit MV | Circuit types SN54121, Sn 74121; Monostable Multivibrators provided by Texas Instruments. |
| Computer Circuit 48 | ND4400 Systems and ND812 Computer provided by Nuclear Data Incorporated. Computer Models NS560, 600 and 660 provided by Northern, a subsidiary of Tracor. |

What is claimed is:

1. Apparatus for monitoring discrete portions of an object to determine the concentration of nitrogen in the respective portions and to develop output signals indicative of the concentration of nitrogen in the respective portions to permit the development of the nitrogen concentration profile of the object, comprising, first means for subjecting an object to a thermal neutron environment, second means including an array of gamma detectors each positioned to view a predetermined portion of said object and produce an output signal indicative of the nitrogen present within the respective portion of said object in response to the gamma ray energy produced by reactions between the nitrogen contained in said portion of the object and the thermal neutron environment, each of said gamma detectors including a scintillator having an end surface for viewing said respective portion of said object, the length of said scintillator being substantially greater than the effective diameter of the end surface, and third means operatively connected to said second means for determining the level of gamma radiation emitted from each of a plurality of predetermined portions of said object.

2. Apparatus as claimed in claim 1 wherein said first means includes a fast neutron source comprised of californium 252, and a neutron moderator.

3. Apparatus as claimed in claim 1 wherein said third means includes means associated with said plurality of gamma detectors to respond to the output signals of said gamma detectors to characterize the output of each of said gamma detectors as a pulse of a different predetermined width, the number of pulses produced by each gamma detector being a function of the nitrogen content of the corresponding discrete portion of said object.

4. Apparatus as claimed in claim 3 further including means for identifying each of said gamma detectors according to said pulse width and producing a representation of the array of said gamma detectors illustrating the nitrogen concentration profile of said object as a function of the number of pulses associated with the respective gamma detectors.

5. Apparatus as claimed in claim 4 further including means for excluding pulses having a magnitude less than 10 MeV.

6. Apparatus as claimed in claim 4 wherein said array of gamma detectors is an X-Y array having a plurality of vertical columns and a plurality of horizontal rows.

7. Apparatus as claimed in claim 6 wherein said means for identifying determines the vertical dimension of the nitrogen concentration profile by monitoring the number of pulses appearing in the rows of said gamma detectors and the horizontal dimension of the nitrogen concentration profile by monitoring the number of pulses present in the columns of gamma detectors.

8. Apparatus as claimed in claim 1 wherein said nitrogen reaction is $^{14}N(n,\nu)^{15}N$.

9. Apparatus as claimed in claim 1 further including a second array of a plurality of gamma detectors identical to the other array and being positioned in opposed, aligned relationship such that one gamma detector from each array view the same portion of said object, said combination of arrays being adapted to receive said object between said aligned group.

10. Apparatus as claimed in claim 9 wherein the output signal of the gamma detectors forming each aligned pair are combined for application to said third means.

11. Apparatus as claimed in claim 1, wherein said scintillator is a plastic or liquid scintillator.

12. Apparatus as claimed in claim 1 further including a total nitrogen content measuring means operatively connected to said third means to respond to the electrical to determine the total nitrogen content of said object.

13. Apparatus as claimed in claim 1 and further including means operatively connected to said third means for defining the nitrogen concentration profile of the nitrogen containing material of said object in response thereto.

14. Apparatus as claimed in claim 13 further including means for comparing the nitrogen concentration profile of said nitrogen containing material with nitrogen concentrations profiles of known materials in order to classify the nitrogen containing material of said object.

15. Apparatus as claimed in claim 1 wherein said array further includes at least one gamma detector including a scintillator having an end viewing surface of an effective diameter of five inches or greater for viewing said object and providing an indication of the total nitrogen content of said object.

16. Apparatus as claimed in claim 15 further including means operatively connected to said third means for classifying the nitrogen containing object on the basis of the total nitrogen content and the nitrogen concentration profile of said object.

17. Apparatus as claimed in claim 1 wherein said first means includes a housing comprised of a neutron moderator material and having a cavity therein for accommodating said object, and a source of fast neutrons positioned within said housing to provide thermal neutron flux within said cavity, said plurality of individual gamma detectors positioned within said housing, each of said gamma detectors viewing a predetermined portion of said object within said cavity and producing an output signal indicative of the nitrogen contained within the respective portion of said object.

18. Apparatus as claimed in claim 8 wherein said cavity is in the form of a passage extending through said housing and further including means for inserting and removing said object in said passage.

19. Apparatus as claimed in claim 18 wherein said means for inserting and removing said object includes spaced apart, vertically disposed members comprised of a neutron moderator material, said spaced apart vertically disposed members define a volume suitable for accommodating said object, said spaced apart vertically disposed members functioning to effectively close the open ends of said passage and cooperate with the walls of said passage to define substantially enclosed thermal neutron flux environment to which said object is subjected.

20. Apparatus as claimed in claim 18 further including means operatively connected to said third to reset said third means in response to the passage of each object.

21. Apparatus as claimed in claim 20 wherein said third means is reset in response to the passage of said spaced apart, vertically disposed members.

* * * * *